Patented Feb. 12, 1952

2,585,454

UNITED STATES PATENT OFFICE 2,585,454

PREPARATION OF A SULFUR-CONTAINING ACTIVATED CARBON

Bernard W. Gamson, Morton Grove, Ill., assignor to Great Lakes Carbon Corporation, New York, N. Y., a corporation of Delaware No Drawing. Application July 7, 1948,
Serial No. 37,497

6 Claims. (Cl. 252—422)

This invention relates to a process for manufacturing an activated carbonaceous material useful for catalytic reactions; decolorizing of mineral and vegetable oils, sugar solutions, etc.; for gas absorption; deodorization; catalysts and catalyst supports, and other purposes.

In one embodiment the invention comprises forming a uniform mixture of a hydrocarbonaceous material with elemental sulfur in proportion at least 60% of the stoichiometrical equivalent of the hydrogen content, at a temperature below about 450° F., preferably in an inert atmosphere, then heating the mixture at about 450–625° F. to produce a solid hard, black, insoluble, infusible amorphous substance, preferably as discrete particles of a desired size, heating the solid substance in the range of 625–1800° F. in a mildly oxidizing atmosphere, preferably of steam, continuing to heat in the presence of the oxidizing gas until the sulfur content is substantially reduced, and finally cooling the activated carbon thus produced in the absence of air. The material from which the activated carbon is made may be produced by the process of my copending application Serial Number 649,730, filed February 23, 1946, now United States Patent No. 2,447,004.

The hydrocarbonaceous materials used in the process comprise hydrocarbons liquid or liquefiable at temperatures in the range of about 300° F.–450° F., and which preferably boil above 350° F. Heavy tars, asphalt, cracked petroleum residues, coal tar pitches, coal tars, wood tar, wood tar pitch, fuel oils, etc., may be used. The hydrogen content should be above about 4% and is preferably about 4–12%.

The solid product of reaction between sulfur and the hydrocarbon which has been produced at 450–625° F. is not active for decolorization and the other purposes noted. Calcining the product at higher temperatures, say 1200–1800° F. causes evolution of hydrogen sulfide but the solid carbonaceous product resulting from this treatment is also not active for the purposes noted. If heated high enough to remove most of the sulfur, the material not only is inactive, but becomes incapable of appreciable activation.

I have discovered that the solid body produced by the heating together, at the temperatures stated, of a uniform mixture of a hydrocarbonaceous substance and sulfur in amount at least 60% of the stoichiometrical equivalent of the hydrogen content, can be rendered active by heating it at a temperature of about 625° F. to not more than 1800° F. in a mildly oxidizing atmosphere under controlled conditions to reduce the sulfur content substantially. Preferably the activating temperature is about 1200° F. to about 1600° F.

Although the activation can be conducted at a given temperature, say 1200–1600° F., it is prefered to gradually increase the temperature over the range of from about 625° F. to an ultimate temperature of 1200–1800° F. The mild oxidizing atmosphere should be maintained during this period.

The oxidizing atmosphere is preferably steam. Carbon dioxide may also be used, or flue gases containing about 1 to 3% oxygen, with or without steam present. Higher percentages of oxygen are to be avoided because consumption of carbon is too high and much product is wasted without compensating improvement in the activity or other properties of the product.

The amount of carbon reacted away and for extent of sulfur reduction required and the temperature of activation are determined by the properties desired and the uses to which the carbon is to be put. These factors are the controlling variables in activation with smaller effects arising from the time of activation and the ratio of steam to carbon originally charged.

The solid product from which the activated body is made is termed a sulfohydrocarbon and has the following approximate composition:

Carbon, about 47% to about 70%
Hydrogen, about 4% to about 1.8%
Sulfur, about 40% to about 25%
Ash, to about 2.5%
Density, from about 1.3 to about 1.7

The sulfur is substantially all in chemical combination with carbon and hydrogen.

The product after activation has the approximate composition:

| | Percent |
|---|---|
| Carbon | 80–90 |
| Hydrogen | 0.2–1.0 |
| Sulfur | 2–10 |
| Oxygen | 0–10 |

It should be emphasized that the activation treatment should be in the presence of the activating gas only at temperatures above 625° F., otherwise the character of the final product is substantially changed. In the early stages of heating at temperatures for example 625–900° F., sulfur reaction products are evolved copiously. The ratio of activating gas is kept high, and the temperature may be gradually raised to prevent damage to the final product.

An activated carbonaceous body of somewhat different character, may be prepared by heating the sulfohydrocarbon above described before activation to a temperature in the range of 1100°–1800° F. thus yielding an unactivated solid having a composition of:

Carbon, about 70% to about 93%
Hydrogen, about 1.8% to about 0.3%
Sulfur, about 25% to about 6%
Ash, about 0.1% to about 2.5%
Density, of about 1.5 to about 1.9

The sulfur here contained is in stable chemical combination with carbon and hydrogen.

The treatment of these latter bodies, defined as sulfocarbons, with an oxidizing gas such as steam or carbon dioxide is carried out at about 1200° F. to about 1800° F. using similar conditions otherwise.

The proportion of steam or other activating gas used to activate the sulfocarbon is about the same as for the sulfohydrocarbons. The temperature of activation need not be increased during activation. Sulfur is removed, although generally more slowly than from the sulfohydrocarbons. As a rule, denser carbons suitable for gas absorption can be made in this way. The activated product is amorphous.

The following examples illustrate the invention but should not be interpreted as limiting it to the exact conditions described therein.

*Example I*

A uniform mixture of a petroleum residuum having a hydrogen content of 7.45% with elemental sulfur in the proportion of the stoichiometrical equivalent of the hydrogen content was prepared at 350° F. This mixture was heated at 585° F. for one hour to produce a solid, hard, black, insoluble, infusible sulfohydrocarbon of the following composition.

| | |
|---|---|
| Carbon _____ per cent__ | 57 |
| Hydrogen _____ do_____ | 3.8 |
| Sulfur _____ do_____ | 39 |
| Ash _____ do_____ | 0.1 |
| Real density_____ | 1.5 |

This sulfohydrocarbon was then heated to 625° F. and an atmosphere of steam was introduced and heating continued to 1700° F. at an upheat rate of 245° F. per hour. It was subsequently maintained at 1700° F. for 3.25 hours until 80% of the original sulfohydrocarbon had disappeared. The analysis of the activated carbon product was:

| | |
|---|---|
| Carbon _____ per cent__ | 88.8 |
| Hydrogen _____ do_____ | 0.2 |
| Sulfur _____ do_____ | 2.6 |
| Ash _____ do_____ | 0.4 |
| Oxygen _____ do_____ | 8.0 |
| Real density_____ | 1.72 |

The activated product was active for gas absorption and decolorizing of sugar solutions.

*Example II*

A sulfocarbon prepared by calcining the sulfohydrocarbon of Example I at 1400° F. had the following analysis:

| | |
|---|---|
| Carbon _____ per cent__ | 76.19 |
| Hydrogen _____ do_____ | 0.94 |
| Sulfur _____ do_____ | 15.22 |
| Density _____ | 1.63 |

It was activated by passing steam over it at 1600° F. until 70% of the material had been consumed. Air was excluded from the activator and the material was cooled before removal therefrom. It had the following analysis:

| | Per cent |
|---|---|
| Carbon | 87.3 |
| Hydrogen | 0.47 |
| Sulfur | 3.30 |
| Oxygen | 8.8 |

It was amorphous, no longer hard and dense, and was as active as the best activated wood chars for absorbing iodine vapors. The heat of wetting in metaxylene indicated marked activity.

I claim as my invention:

1. A process for producing an activated carbonaceous body which comprises forming at about 300–450° F. a uniform mixture of a heavy hydrocarbonaceous substance boiling above about 350° F. and liquid in the range of about 300–450° F., and having a hydrogen content of about 4 to about 12%, with elemental sulfur at least 60% the stoichiometric equivalent of the hydrogen content, heating the mixture at about 450–625° F. to produce a hard, black, dense, infusible, insoluble solid containing carbon about 47% to 70%, hydrogen about 1.8% to 4%, sulphur about 25% to 40%, and minor amounts of ash, said sulphur being substantially all in chemical combination with said carbon and hydrogen, heating the solid in mild oxidizing atmosphere at about 625° F. to about 1800° F., and recovering an activated carbonaceous body containing carbon 80% to 90%, hydrogen 0.2% to 1%, sulphur 2% to 10%, and oxygen 0% to 10%.

2. The method of claim 1 in which the temperature of activation is gradually increased during the activation step.

3. The method of claim 1 in which the temperature of activation is gradually increased during activation, and heating is continued to substantial removal of sulfur from the body being activated.

4. The method of claim 1 wherein steam is the activating agent.

5. The method of claim 1 wherein carbon dioxide is the activating agent.

6. A process for producing an activated carbonaceous body which comprises forming at about 300 to 450° F. a uniform mixture of a heavy hydrocarbonaceous substance boiling above about 350° F. and liquid in the range of about 300 to 400° F., and having a hydrogen content of about 4 to about 12% with elemental sulphur at least 60% of the stoichiometric equivalent of the hydrogen content, heating the mixture at about 450 to 625° F. to produce a hard, black, dense, infusible, insoluble solid containing carbon about 47% to 70%, hydrogen about 1.8% to 4%, sulphur about 25% to 40% and minor amounts of ash, said sulphur being substantially all in chemical combination with said carbon and hydrogen; thereafter heating said solid to a temperature of 1100° to 1800° F. to yield a second solid containing carbon about 70% to 93%, hydrogen about 0.3% to about 1.8%, sulphur about 6% to 25% and minor amounts of ash, heating said second solid in a mild oxidizing atmosphere at about 1200° F. to about 1800° F., and recovering an activated carbonaceous body containing carbon 80 to 90%, hydrogen 0.2 to 1%, sulphur 2 to 10%, and oxygen 0 to 10%.

BERNARD W. GAMSON.

REFERENCES CITED

The following references are of record in the file of this patent:

UNITED STATES PATENTS

| Number | Name | Date |
|---|---|---|
| 1,777,943 | Threllfall | Oct. 7, 1930 |
| 1,903,834 | Oberle | Apr. 18, 1933 |
| 1,925,438 | Faben | Sept. 5, 1933 |
| 2,234,769 | McCulloch | Mar. 11, 1941 |

FOREIGN PATENTS

| Number | Country | Date |
|---|---|---|
| 205,884 | Switzerland | July 15, 1939 |